United States Patent [19]

Mork

[11] Patent Number: 4,924,945
[45] Date of Patent: May 15, 1990

[54] SOIL LEVELING APPARATUS WITH IMPROVED SCRAPER MEMBER

[76] Inventor: Orlan H. Mork, 6029 - 225th St. W., Farmington, Minn. 55024

[21] Appl. No.: 257,393

[22] Filed: Oct. 13, 1988

Related U.S. Application Data

[63] Continuation-in-part of Ser. No. 163,178, Feb. 26, 1988, which is a continuation of Ser. No. 856,818, Apr. 28, 1986, which is a continuation-in-part of Ser. No. 224,458, Jan. 12, 1981, Pat. No. 4,448,258.

[51] Int. Cl.$^5$ ............................................. E02F 3/815
[52] U.S. Cl. .................................... 172/197; 172/445.1
[58] Field of Search ................. 472/445.1, 445.2, 197, 472/684.5, 799.5, 784

[56] References Cited

U.S. PATENT DOCUMENTS

| | | |
|---|---|---|
| 425,793 | 4/1890 | Holland . |
| 563,760 | 7/1896 | Folsom . |
| 939,664 | 11/1909 | Casner . |
| 1,176,591 | 3/1916 | Monroe . |
| 1,200,113 | 10/1916 | Hunter . |
| 1,247,416 | 11/1917 | Leak . |
| 1,267,623 | 5/1918 | Bowen . |
| 1,585,044 | 5/1926 | Patton . |
| 1,727,181 | 9/1929 | Skinner . |
| 1,755,631 | 4/1930 | Burnett . |
| 1,833,878 | 11/1931 | Adams . |
| 2,302,702 | 11/1942 | Leschinsky . |
| 2,346,757 | 4/1944 | Horner . |
| 2,405,980 | 8/1946 | Sands . |
| 2,578,131 | 12/1951 | Gannon . |
| 2,657,619 | 11/1953 | Gilreath . |
| 2,762,140 | 9/1956 | Elfes . |
| 2,795,060 | 6/1957 | Geisler . |
| 2,817,203 | 12/1957 | Sievers . |
| 2,865,117 | 12/1958 | Davis et al. . |
| 2,983,060 | 5/1961 | Rosselot . |

(List continued on next page.)

FOREIGN PATENT DOCUMENTS

| | | |
|---|---|---|
| 1074994 | 4/1980 | Canada . |
| 430341 | 6/1926 | Fed. Rep. of Germany . |
| 1314296 | 11/1962 | France . |
| 117395 | 8/1969 | Norway . |
| 813809 | 5/1959 | United Kingdom . |
| 849677 | 9/1960 | United Kingdom . |

OTHER PUBLICATIONS

Ford brochure, "Front and Rear Mounted Blades", Bearing 1958, copyright notice to Ford Motor Company.
Ford Rotary Cutters brochure, penultimate page.
Product brochure for the Jacobsen Trap King II (undated).
Brillion, "AG Model Sure-Stand Grass Seeder" brochure (undated).
Turfshaper: The Missing Link Between the Bulldozer and Mower, Bearing 1977 copyright notice to Lely Corp.
Product brochure for the New Super Gill '100'and '200' (undated).
Product brochure for the Viking Roller Blade (undated).
"Break New Ground with a Rock Hound B Series" brochure (undated).
Product brochure for Track Type Tractors, from Caterpillar Tractor Co. (undated).
700 Series Bobcat Loader product brochure from Clark Equipment Co. (undated).

Primary Examiner—Richard J. Johnson
Attorney, Agent, or Firm—Merchant, Gould, Smith, Edell, Welter & Schmidt

[57] ABSTRACT

An improved soil leveling apparatus consisting of a scraper member with an edge and a plurality of ground engaging members with surfaces, the above connected by a pair of longitudinal side members, hitch structure attached, an optional lost motion linkage on the top portion of the hitch, an optional scarifier assembly, and a horizontal plate attached to the scraper member with vertical adjustment structure on the plate to change the scraper member from an edge to a flat surface and vice versa.

13 Claims, 6 Drawing Sheets

U.S. PATENT DOCUMENTS

| | | |
|---|---|---|
| 2,994,142 | 8/1961 | Newell et al. |
| 3,122,209 | 2/1964 | Crites |
| 3,193,306 | 7/1964 | Pettit |
| 3,213,544 | 10/1965 | Dalton |
| 3,274,712 | 9/1966 | Jones |
| 3,274,713 | 9/1966 | Jones |
| 3,276,153 | 10/1966 | Sorensen |
| 3,324,955 | 6/1967 | Perold |
| 3,336,685 | 8/1967 | Keller |
| 3,556,228 | 1/1971 | Mork |
| 3,692,120 | 9/1972 | Cline |
| 3,705,630 | 12/1972 | Visser |
| 3,724,557 | 4/1973 | Boschung et al. |
| 3,834,465 | 9/1974 | Collins |
| 3,904,380 | 9/1975 | Smith |
| 3,905,425 | 9/1975 | Jackson |
| 4,155,315 | 5/1979 | Dobbins |
| 4,196,778 | 4/1980 | Smith |
| 4,239,251 | 12/1980 | Rockvold |
| 4,320,988 | 3/1982 | Seal |
| 4,386,662 | 6/1983 | Kalif |
| 4,418,759 | 12/1983 | Mork |
| 4,436,040 | 3/1984 | Chumley |
| 4,448,258 | 5/1984 | Mork |
| 4,505,075 | 4/1986 | Mork |
| 4,815,542 | 3/1989 | De Plazes |

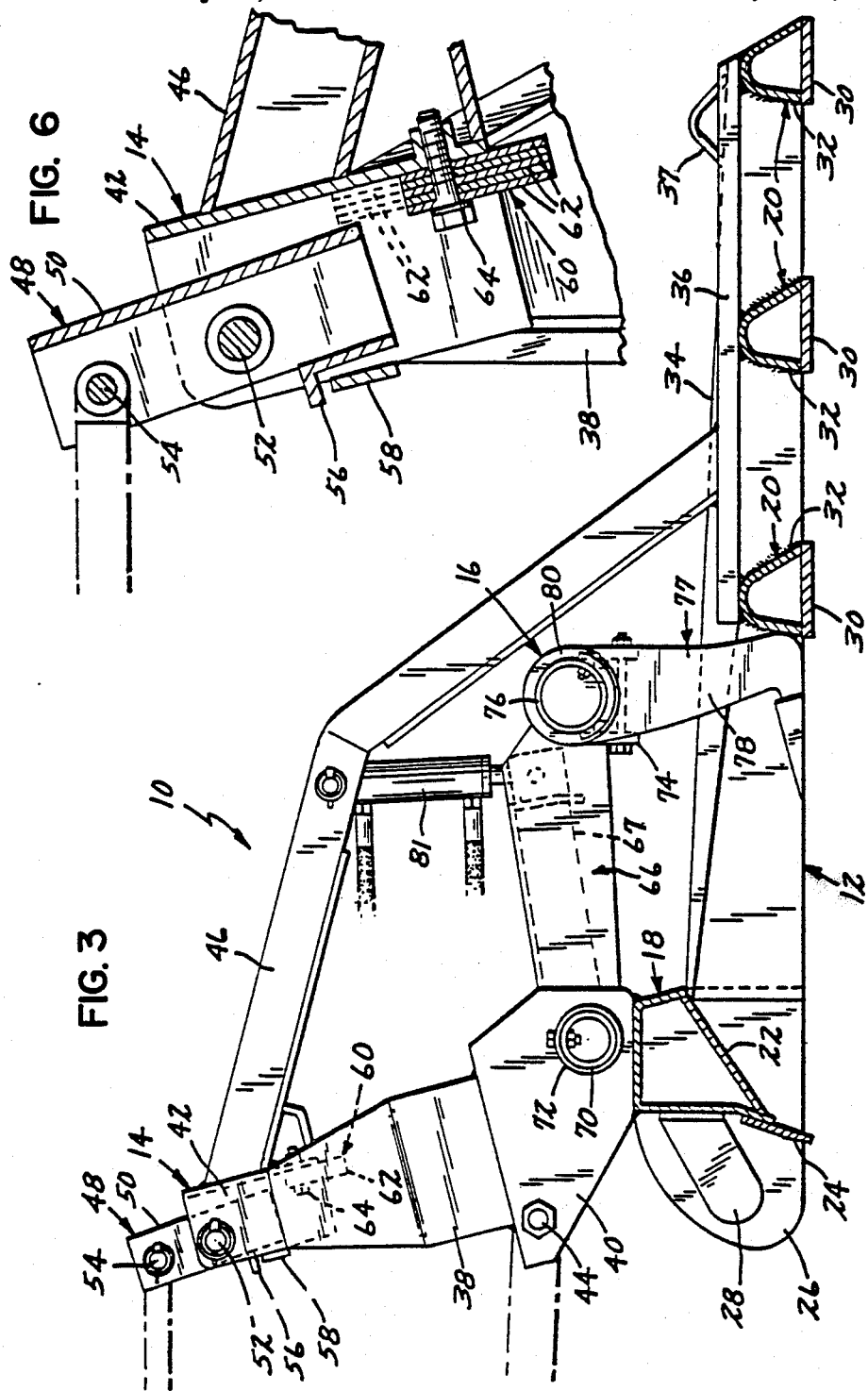

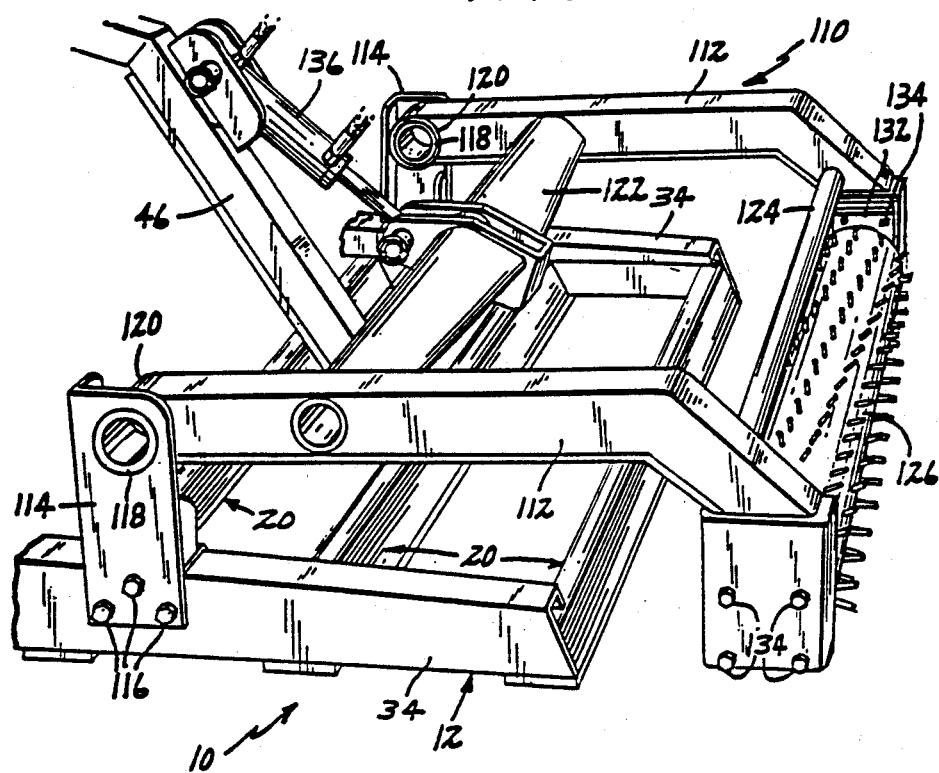

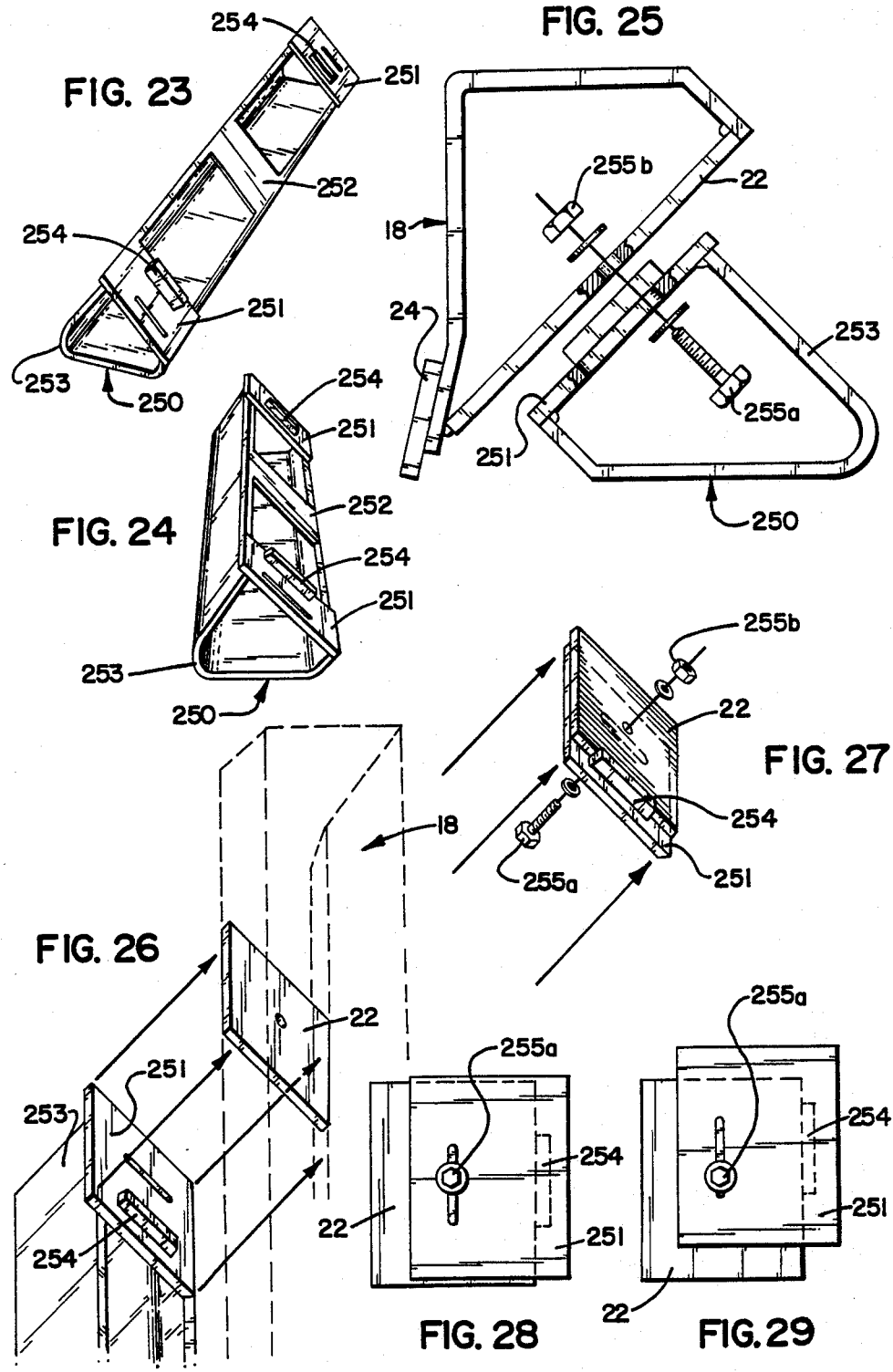

SOIL LEVELING APPARATUS WITH IMPROVED SCRAPER MEMBER

CROSS REFERENCE TO RELATED APPLICATION

This application is a continuation in part of my co-pending application Ser. No. 163,178 filed Feb. 26, 1988, which is a continuation of application Ser. No. 856,818 filed Apr. 28, 1986, which in turn is a continuation in part of application Ser. No. 224,458 filed Jan. 12, 1981, now U.S. Pat. No. 4,448,258.

TECHNICAL FIELD

The present invention relates generally to a device for attachment to a vehicle for cutting, leveling and otherwise grading the soil or the like. More particularly, this invention concerns a soil leveling apparatus incorporating an improved scraper member which provides more versatility and controlability in order to achieve better performance.

BACKGROUND ART

Planing soil working devices consisting of a combination of edges and surfaces have to grade and level all types of soils. In the past these devices were constructed with their edges and surfaces fixed rigidly within a vehicle drawn frame work, as is shown in my prior patents. When grading hard soils, it is advantageous to have an edge or scraper to penetrate and cut soils to facilitate moving the soil while trailing planing beams or surfaces flow out the soil and secure a smooth surface. On the other hand in loose or soft soils (soils that do not easily compact such as sand or peat) it is helpful to have all surfaces on the planing device to act as flotation members or skids to prevent gouging and to hold up the weight of the tool while moving the soil. Thus, there has been a long and unfilled need in the field for an adjustable attachment on the scraper or edge of a planing device to allow the scraper to be changed from an edge to a flat surface and vice versa as desirable.

An adjustable edge to flat surface arrangement also aids when soil moisture changes when an edge is usually needed in dry, hard ground and a surface is needed in wet, soft soils.

New tractor operators grading with planing devices also prefer surfaces to compensate for their lack of experience while well-trained tractor operators prefer an edge equipped planing device for more, efficient tractor - planer operation. This is particularly the case with a planing device mounted on a skid-steer loader tractor.

There is definitely a need for a more versatile improved grading device.

SUMMARY OF THE INVENTION

The present invention comprises an improved soil leveling apparatus which overcomes the foregoing and other difficulties associated with the prior art. In accordance with the invention, there is provided a soil leveling apparatus having an improved frame, improved scraper, connection structure for the hitch, and other features and options which enhance its capability and versatility.

The frame comprises a plurality of transverse ground engaging members, the leading member being a scraper member of generally inverted J-shaped cross section in order to avoid soil plugging. A horizontal plate, when attached to the scraper member, reduces the penetrating capabilities of the scraper member to facilitate more efficient working in soft soils. The frame includes a pair of laterally spaced apart side frame members which are of uneven channel-like configuration secured to opposite ends of the trailing ground engaging member so as to reduce construction costs while providing the necessary structural rigidity.

The trailing ground engaging members are of generally inverted rounded V-shaped cross section in order to provide a substantially upright surface for pushing the soil in a forward direction, with an inclined surface for lifting the soil in a rearward direction.

The connection structure on the frame for securing the apparatus to a three-point hitch is of generally A-shaped configuration, which is also adapted to serve as the support for the adjustable scarifier assembly. This also simplifies construction of the soil leveling apparatus and enhances the structural integrity thereof. An adjustable lost motion linkage is preferably provided at the top end of the connection means for receiving the top link of a three-point hitch in order to provide the degree of play desirable under the particular conditions.

BRIEF DESCRIPTION OF DRAWINGS

A better understanding of the invention can be had by reference to the following Detailed Description in conjunction with the accompanying Drawings wherein:

FIG. 3 is a vertical sectional view taken along lines 3—3 of FIG. 1 in the direction of the arrows;

FIG. 6 is a vertical sectional view of the upper portion of the hitch shown in FIG. 3;

FIG. 9 is a partial perspective view showing the soil leveling apparatus herein with an optional pivotal pulverizor assembly mounted thereon;

FIG. 23 is a perspective view of the flotation member;

FIG. 24 is a perspective view of the flotation member;

FIG. 25 is a cross sectional view of the scraper member of the soil leveling apparatus and the flotation plate;

FIG. 26 is an enlarged detail view of the alignment plates of the flotation plate and the scraper member of the soil leveling apparatus;

FIG. 27 is a detail view of the fastening means of the alignment plates of the flotation plate and scraper member of the soil leveling apparatus;

FIG. 28 is a rear view of a pair of alignment plates showing the plate's adjustment when the flotation plate is at its lower limit;

FIG. 29 is a rear view of a pair of alignment plates showing the plate's adjustment when the flotation plate is at its upper limit.

DETAILED DESCRIPTION

The entire disclosure of co-pending continuation application Ser. No. 163,178 filed Feb. 26, 1988 and U.S. Pat. No. 4,448,258 is incorporated herein by reference.

Figure 1A:
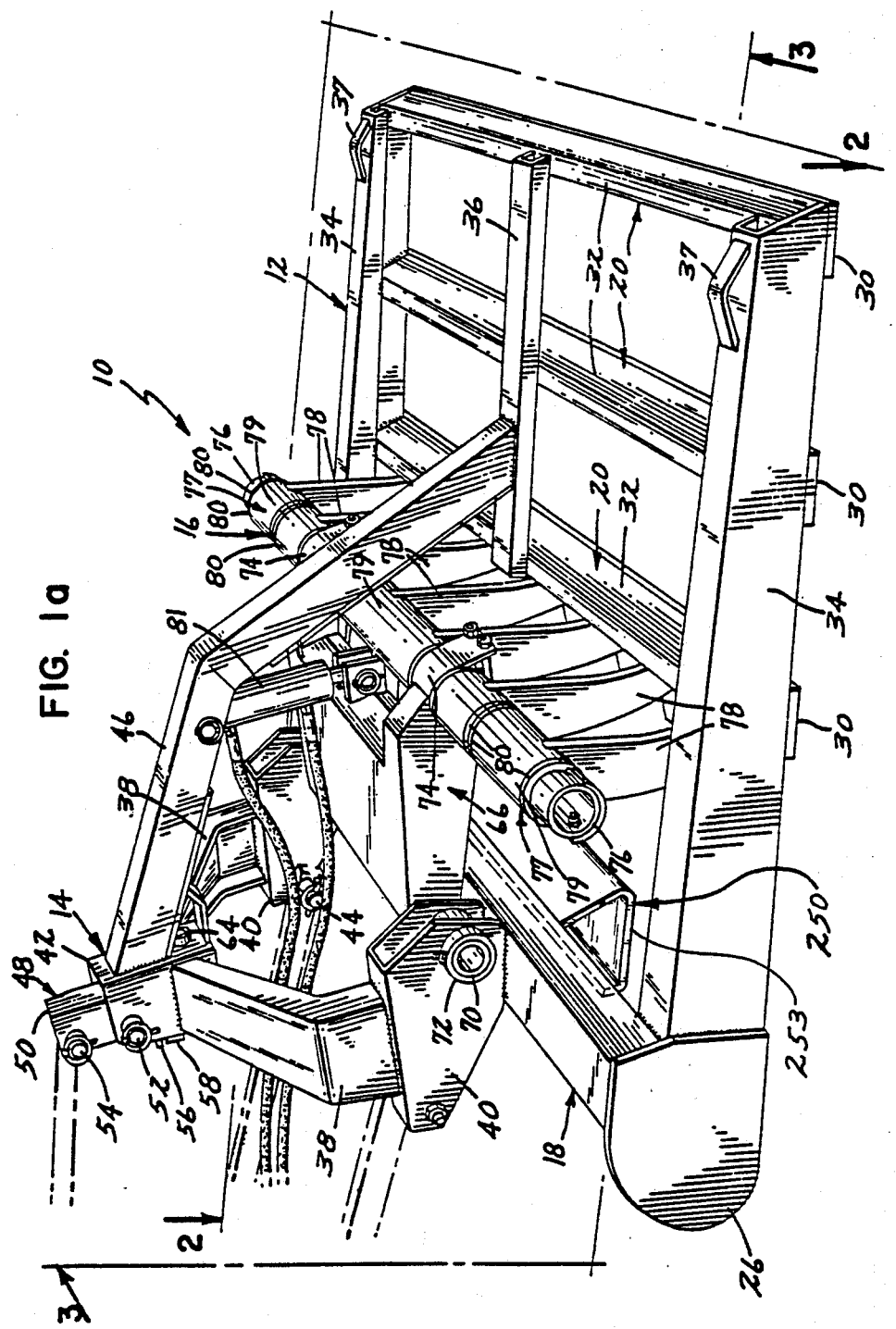
FIG. 1a is a perspective view of an improved soil leveling apparatus incorporating the embodiment of the invention.

Referring now to the Drawings herein, in which like reference numerals designate like or corresponding elements throughout the views, and particularly referring to FIG. 1a, there is shown a soil leveling apparatus 10 of the invention. The apparatus 10 comprises a frame 12, a hitch or connection means 14 mounted on the frame for attachment of the apparatus to a suitable draft means, and a scarifier assembly 16.

As illustrated, the connection means 14 is adapted for use with a three-point hitch, however, it will be appreciated that the frame 12 of the apparatus 10 can be provided with a connection means like that shown in the parent application for use with a skidsteer vehicle or any other suitable connecting hitch means depending upon the type of draft vehicle with which the apparatus is to be used.

Figure 2:
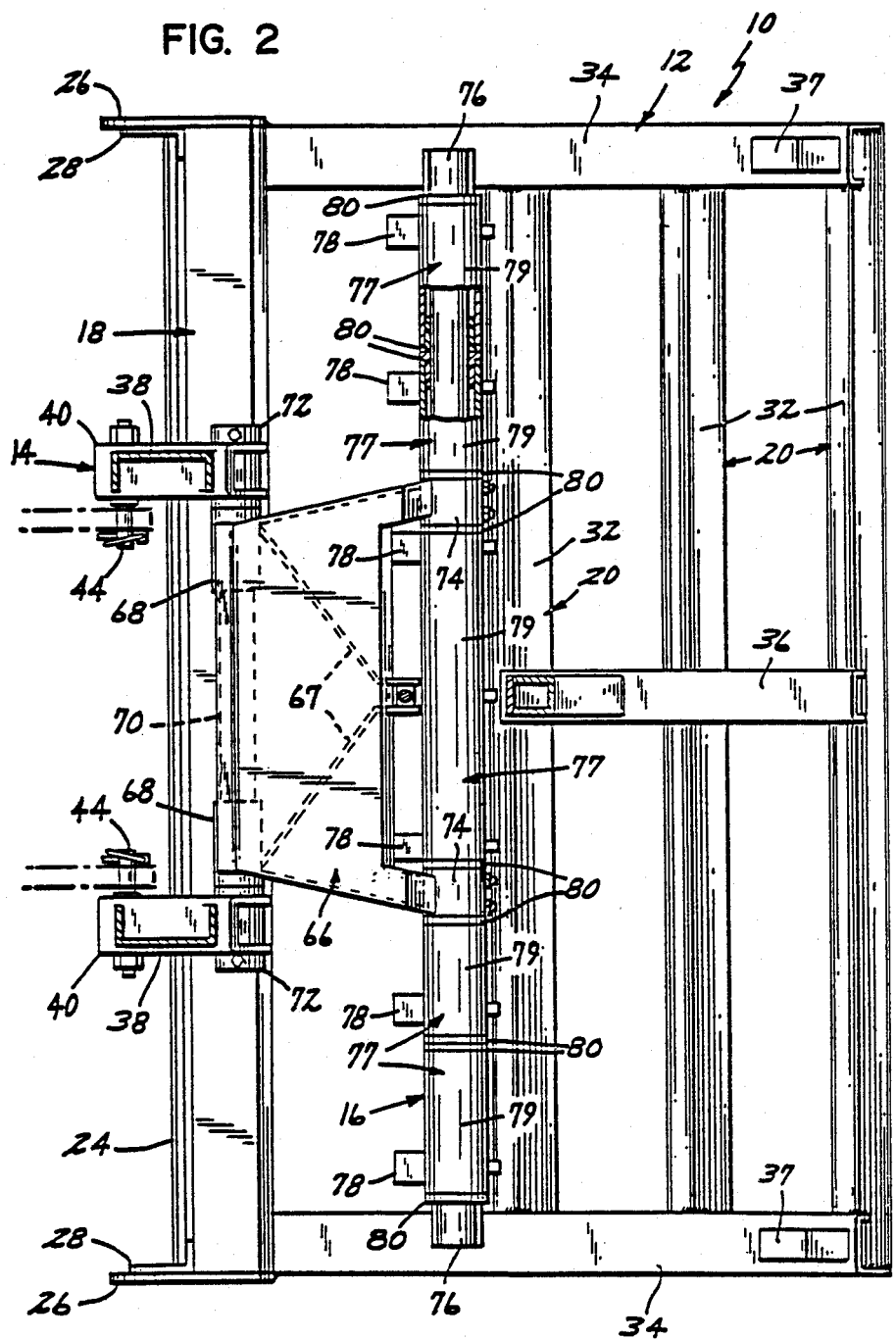
FIG. 2 is a horizontal sectional view taken along lines 2—2 of FIG. 1 in the direction of the arrow.

Referring now to FIG. 1a in conjunction with FIGS. 2 and 3, the frame 12 of the soil leveling apparatus 10 comprises a leading ground engaging member 18 and a plurality of trailing ground engaging members 20. All of the ground engaging members 18 and 20 are oriented transverse 4 to the direction of travel of the apparatus 10. The forward ground engaging member, 18, as is best seen in FIG. 3, is of generally inverted J-shaped cross section and includes braces 22 secured between the divergent front and back walls of the ground engaging member. A blade 24 is secured to the front, relatively longer wall of the ground engaging member 18 for better cutting action and wear resistance. The blade 24 can be welded, bolted or otherwise suitably secured to the forward ground engaging member 18. It will thus be apparent that the rear wall of the forward ground engaging member 18 is relatively shorter than the front wall. This is advantageous because it provides rigidity without allowing soil to plug the interior of the member, which can occur under certain conditions when an inverted channel section is utilized for the forward ground engaging member. The forward ground engaging member 18 thus functions as a scraper member.

The forward ground engaging member 18 is secured between a pair of side plates 26 which serve as soil retainers to provent the soil from flowing outwardly around the apparatus and thus forming ridges. If desired, braces 28 can be secured between the soil retaining plates 28 and the forward ground engaging member 18 for reinforcement.

A plurality of trailing ground engaging members 20 are located behind the forward ground engaging member 18 for purposes of leveling the soil. Three trailing ground engaging members 20 are shown, however, any suitable number can be utilized. Each trailing ground engaging member 20 includes a wear plate 30 secured to and enclosing the open end of a hollow member 32. The hollow member 32 is preferably of generally inverted rounded V-shaped cross section with the forward wall thereof being substantially upright in order to push the soil in a forward direction, and the rear wall being inclined to allow the soil to pass over the ground engaging member in the reverse direction.

The trailing ground engaging members 20 are secured between a pair of longitudinal side members 34. Each side member 34 is of general channel-shaped cross section along the portion thereof extending between the trailing ground engaging members 20 with the upper surfaces of the side members sloping downwardly away from the forward ground engaging member 18. The ends of the trailing ground engaging members 20 are thus butted against the outer legs of the side members 34 and are welded at their ends both to the outer leg and to the lower edge of the inner legs of the side members. A longitudinal member 36 is preferably secured across the tops of the trailing ground engaging members 20 for additional rigidity. If desired, lugs 37 can be attached to the side members 34 for connection of a drag or the like to the apparatus 10.

The connection means 14 is of generally A-shaped configuration including a pair of legs 38 which are secured at their lower ends to a pair of laterally spaced apart feet or supports 40 secured to the forward ground engaging member 18. The legs 38, which are inclined forwardly as shown, extend upwardly to a member 42. The connection means 14, as illustrated, is adapted for use with a threepoint hitch, the top and bottom links of which are indicated by phantom lines. The base supports 40 include pivotal connection points 44 for attachment to the bottom links of a three-point hitch, while the top member 42 is adapted for attachment to the top link of the three-point hitch. A longitudinal brace 46 is preferably connected between the top member 42 of the connection means 14 and the longitudinal member 46 of the frame 12.

Referring to FIG. 3 in conjunction with FIG. 6, the soil leveling apparatus 10 preferably includes a lost motion linkage 48 in the top member 42 of the connection means 14. The purpose of the lost motion linkage 48 is to provide an adjustable amount of controlled play between the top link of the three-point hitch on the draft vehicle (not shown) and the connection means 14 so that some pivotal floating action of the soil leveling apparatus can occur. The lost motion linkage 14 includes a plate 50, which is illustrated as being a section of channel stock, supported for pivotal movement on a pin 52 extending across the top member 42. Another pivotal connection 54 is provided at the upper end of the plate 50 for attachment to the top link of the three-point hitch on the draft vehicle. A first stop 56 is secured to the lower end of the plate 50 for cooperation with a cross piece 58 extending across the lower end of the top member 42. The lost motion linkage 48 thus includes a fixed stop which limits rearward pivotal motion of the plate 50. An adjustable stop 60 is also provided for limiting forward pivoting of the plate 50. As illustrated, the adjustable stop 60 comprises a number of shims 62 with offset holes therein through which a bolt 64 extends to secure the shims to the inside of the top member 42. It will thus be appreciated that the amount of pivotal motion of the plate 50 can be controlled by loosening the bolt 64 and turning a suitable number of shims upwardly between the lower end of the plate 50 and the back of the top member 42, as shown in FIG. 1, and then tightening the shims in place with the bolt 64 so as to limit the range of fore/aft pivotal movement of the linkage 48. This comprises a significant feature of the present invention. By means of the adjustable lost motion linkage 48, suitable play can be provided between the top link of a three-point hitch and the connection means 14 of the soil leveling apparatus 10.

Referring again to FIGS. 1 through 3, the soil leveling apparatus 10 preferably includes a scarifier assembly 16 which is mounted for adjustable, vertical positioning relative to the frame 12. The scarifier assembly 16 includes a single connector 66 having a pair of sleeves 68 secured at the forward end for receiving a cross shaft 70 extending between the base members 40 of the connection means 14. The cross shaft 70 extends through the sleeves 68 of the connectors 66 and through bushed holes in the base members 40, and is retained in place by means of collars 72.

The connector 66, which is preferably formed from a piece of plate bent as shown for rigidity, also includes a pair of clamps 74 at the side opposite that of the sleeves 68. Clamps 74 function to secure the pivotal connector 66 to a second, relatively longer cross shaft 76 on which the teeth subassemblies 77 are suspended in side-by-side relationship between end caps 75. Each subassembly 77 includes a depending tooth 78 secured at its upper end to a sleeve 79 pivotally supported on the second cross shaft 76. The scarifier teeth 78 can be individually pivoted to the cross shaft 76, or pivotally supported in groups. Bushings 80 are provided in the ends of each sleeve 79. A double acting cylinder 81 is connected between the top brace 46 and a pair of lugs on the connector 66 for controlling the position of the scarifier assembly 16 and thus the extent of penetration into the soil by the teeth 78.

The scarifier assembly 16 as shown in FIGS. 1a through 3 includes a number of pivotal scarifier teeth 78 whose rearward pivotal motion is limited by the adjacent trailing ground engaging member 20. The longitudinal spacing between the forward ground engaging member 18 and the next adjacent ground engaging member 20 is preferably sufficient to allow the scarifier teeth 78 to pivot forwardly out of ground engagement when the apparatus 10 is reversed.

Referring now to FIG. 9 there is shown an optional pulverizer attachment 110 which can be mounted on the soil leveling apparatus 10 to provide additional soil working. The attachment 110 includes a pair of arms 112 which are pivoted at their forward ends to brackets 114 secured by bolts 116 to the side members 34 of frame 12. Each bracket 114 includes an inner sleeve 118 on which an outer sleeve 120 of the associated arm is received to define a pivot. A pair of cross members 122,124 are secured between the arms 112 for rigidity and bracing. A toothed roller 126 is mounted for rotation between the outer or trailing ends of the arms 112. Altough the assembly 110 is illustrated with a toothed roller 126 for pulverizing small dirt clods and the like, it will be appreciated that other devices can be mounted on the attachment. For example, a row of spring fingers or flexible tines can easily be substituted for the toothed roller 126 and carried by the attachment 110.

Referring now to FIGS. 15a, 16a, 17a, 17b, there is shown a soil leveling apparatus 200 incorporating a second embodiment of the invention. The soil leveling apparatus 200 of the second embodiment incorporates numerous component parts which are substantially similar to those employed in the apparatus 10 of the first embodiment herein. Such component parts have been identified with the same reference numerals utilized herein before, but have been differentiated therefrom by means of prime (') notations.

The primary difference between the soil leveling apparatus 200 of the second embodiment and the apparatus 10 of the first embodiment is centered in the areas of the hitch and the scarifier assembly. The apparatus 10 of the first embodiment incorporates a connection means 14 which is adapted for use with a three-point hitch, like that typically used on tractors. The soil leveling apparatus 200 of the second embodiment, however, preferably includes a hitch 202 which is particularly adapted for use with adapters of the type found on skid steer loaders, altough either type of hitch can be used.

The hitch 202 comprises a pair of laterally spaced apart side plates 204 which are interconnected by cross plates 206 and 208 defining a converging recess for receiving the upper edge of the pivotal edge adapter plate on the loader. As shown, the cross plate 206 is reinforced by a channel section 210 and an upright post 212. A pair of laterally spaced apart lower mount plates 214 are secured to the front wall of the leading ground engaging member 18' for releasable connection with latches on the lower end of the adapterplate (not shown) on the loader. An adaptor plate of suitable construction is shown in U.S. Pat. No. 3,672,521, the entire disclosure of which is incorporated herein by reference.

As illustrated, the soil leveling apparatus 200 also includes an optional scarifier assembly 216. The apparatus 200 can be used either with or without the scarifier assembly 216. As shown the scarifier assembly 216 includes a fixed cross shaft 218 secured between a pair of brackets 220 fixed to the longitudinal side members 34', which are preferably of inverted generally J-shaped cross section, although side members of any suitable configuration can be used. A sleeve 222 is supported for rotation about the fixed shaft 218, and a plurality of depending scarifier teeth 224 are secured along the sleeve.

Figure 17A:
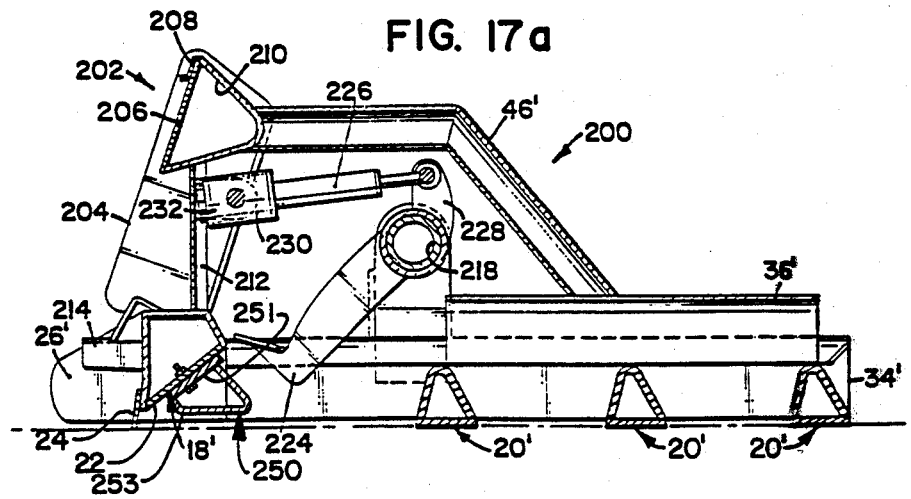
FIG. 17a is a vertical sectional view taken along lines 17—17 of FIG. 16 in the direction of the arrows showing the flotation member in an upper position.

The scarifier assembly 216 is actuated by a cylinder 226 coupled between an offset lug 228 secured to the sleeve 222, and a collar 230 as is best seen in FIG. 17a. The piston end of cylinder 226 is coupled to lug 228, while the cylinder end thereof is slideably received in the collar 230. The collar 230 is pivoted on a pair of trunions secured between a pair of lugs 232 on the post 212. In the preferred embodiment, a liner 234 of plastic or other suitable low friction material is provided within the collar 230 to facilitate slideable movement of the cylinder 226. This construction thus provides a lost motion connection which enables the operator to reverse direction with the scarifying teeth 224 pivoting upward and riding on the ground, but without actuating cylinder 226. When cylinder 226 is extended, the cylinder end thereof moves within collar 230 into stopped engagement with post brace 212 so that the scarifier teeth 224 are raised completely or partially out of engagement with the soil. When the cylinder 226 is retracted, the scarifier teeth 224 simply return to their lowered positions, undergravity, as the cylinder end slides away from post 212 in the collar 230, thus providing a lost motion connection which enables the teeth to ride up out of engagement with the soil when the unit is reversed without requiring actuation of the cylinder.

It will be noted that the soil leveling apparatus 200 also incorporates a longitudinal member 361 and a longitudinal brace 461 of generally channel-like construction, but more rounded in order to facilitate forming in a simpler, less expensive manner. In all other respects, the soil leveling apparatus 200 is functionally and structurally similar to the apparatus 10.

Figure 15A:
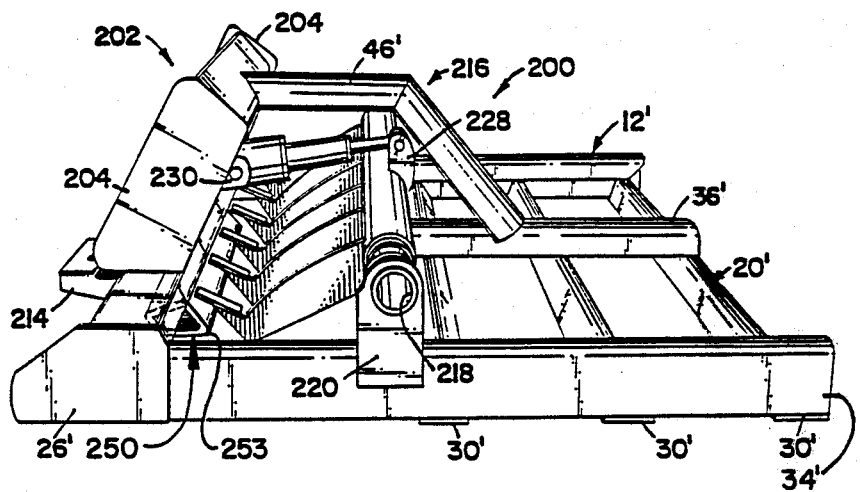
FIG. 15a is a perspective view of an improved soil leveling apparatus incorporating the embodiment of the invention.

Referring now to FIGS. 1a and 15a, there is an optional flotation plate 250 attached for vertical adjustment to the rear and under side of scraper 18 and 18' respectively.

As is shown in FIGS. 23 and 24, the flotation plate 250 is comprised of a channel 253, the channel having two legs and a horizontal surface, a pair of plates 251, each plate at opposite ends of the channel and a plate 252 in the center of the channel. All three of the above plates connect the legs of the above channel.

Also, attached to the two plates 251 are two steel blocks 254, with one block 254 welded on each plate 251. These blocks 254 are parallel and serve as alignment guides. Plates 251 have vertical slots cut out long enough to permit full vertical adjustment of the flotation plate 250.

The vertical slots in plates 22 allow the bottom of the flotation plate 250 to be adjusted level with the bottom edge of scraper 18 regardless of the wear on the cutting edge of scraper 18 due to usage.

As best seen in FIG. 25, flotation plate 250 attaches to plates 22 on scraper member 18. Alignment guides 254 fit between plates 22 to guide the flotation plate 250 while it is being adjusted vertically and to prevent the flotation plate 250 from shifting lengthwise on the plates 22.

In FIG. 26, the alignment of plate 251 on the flotation member 250 and plate 22 on the scraper member 18 can be seen. The hole in plate 22 corresponds with the slot in plate 251. In FIG. 27, the fastening means of plate 22 and plate 251 is shown to be bolt 255a and nut 255b, which serve to clamp plates 22 and 251 securely together. It will be appreciated by those skilled in the art that other means could be used to hold flotation plate 250 in a secure position but still allow adjustment in relation to scraper member 18 and its plate 22. Some of those means are a clamp, vertical screw type adjuster or hydraulic cylinder. These means are all considered the equivalent.

Figure 17B:
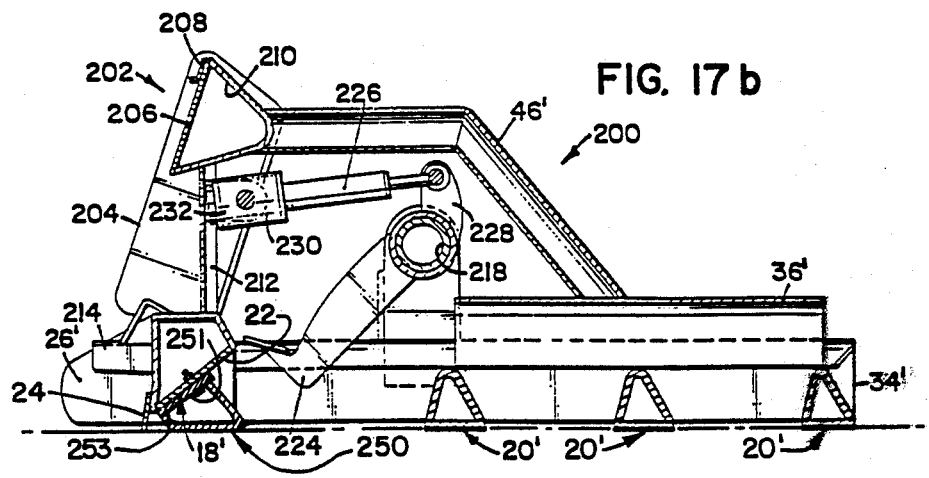
FIG. 17b is a vertical sectional view taken along lines 17—17 of FIG. 16 in the direction of the arrows showing the flotation member in a lower position.

Referring to FIGS. 17a and 17b, the vertical adjustment of the flotation plate 250 can be seen. This adjusting is done by loosening clamping bolt 255a and nut 255b, sliding the flotation plate 250 diagonally up or down on plate 22 of scraper member 18' to the desired position and retightening clamping bolt 255a and nut 255b. This movement of flotation plate 250 accomplishes a vertical raising or lowering of the lower horizontal surface of flotation plate 250. In effect, the movement of flotation plate 250 from an upper vertical limit to a lower vertical limit changes scraper 18 from an edge to a surface.

In FIG. 17a, the upper limit is shown where the lower surface of flotation plate 250 is above the plane of the bottoms of ground engaging members 18' and 20'. In this position, the scraper member 18' can penetrate and cut into hard ground. In FIG. 17b where the lower surface of flotation member 250 is substantially coplanar with the bottoms of ground engaging members 18' and 20', the flotation plate 250 serves as a skid to prevent scraper member 250 from gouging into the soil. As seen in FIGS. 28 and 29, where plate 251 of flotation member 250 is attached to plate 22 of scraper member 18 the extreme limits of vertical adjustment are evident. FIG. 28 shows the lower vertical limit of flotation plate 250 while FIG. 29 shows the upper vertical limit of flotation plate 250. Alignment guides 254 secured to plate 25 keep the lower surface of the flotation plate 250 parallel to the lower edge of scraper 18.

Figure 16A:
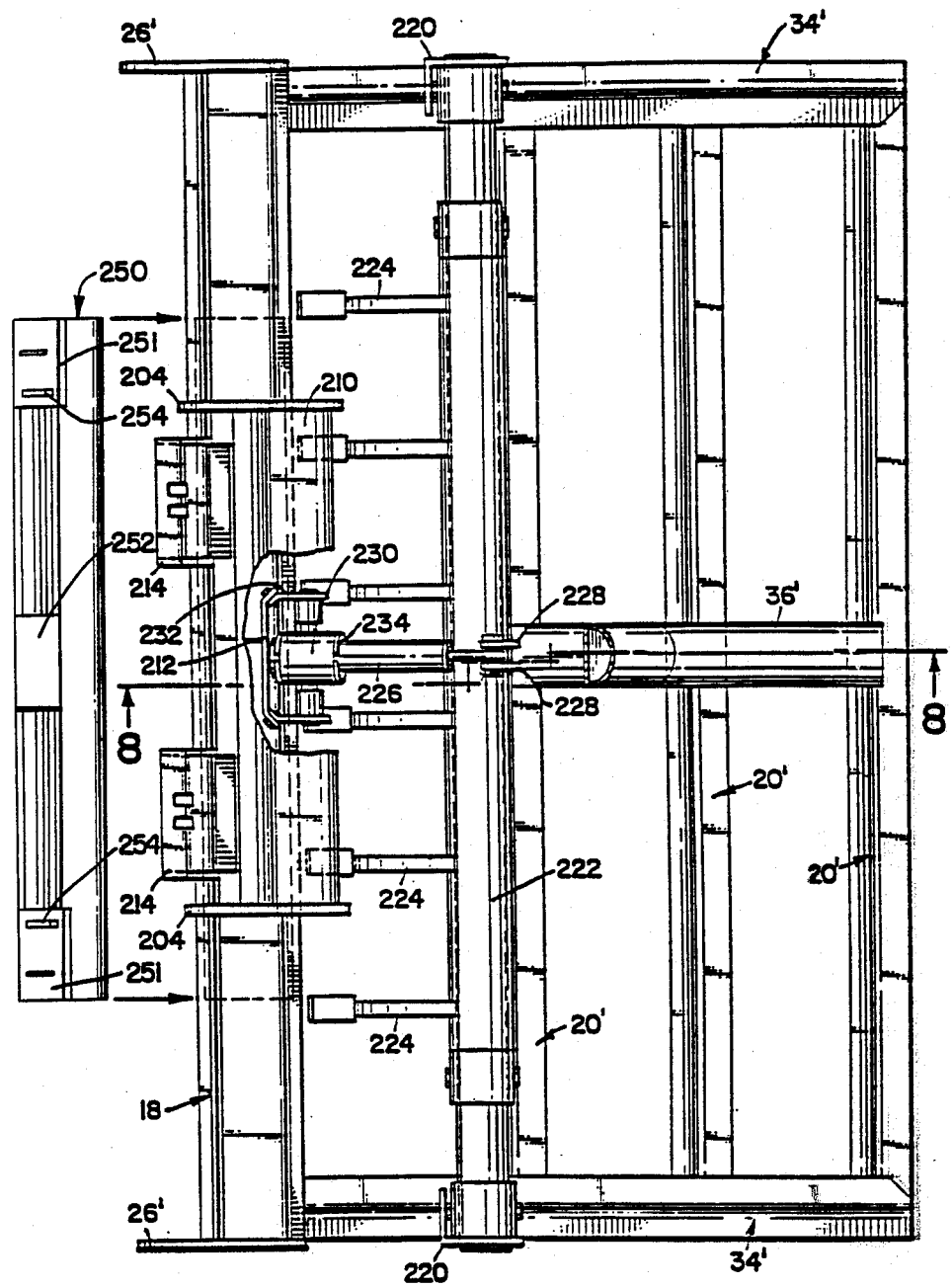
FIG. 16a is a top view of the soil leveling apparatus with the flotation plate removed to show its size, relationship and positioning within the soil leveling apparatus.

Referring now to FIG. 16a, the flotation plate 250 is centered transversely on scraper member 18. The length of the flotation plate 250 shown is less than the length of the scraper member 18. It will be appreciated by those skilled in the art that any length of flotation plate 250 up to the inside length of scraper member 18 could be used depending on soil conditions. In extremely soft soil conditions, a longer flotation plate 250 than shown would be desirable. As is apparent in the drawings the rear edge of the floatation plate 250 is rounded.

From the foregoing, it will thus be apparent that the present invention comprises an improved soil leveling apparatus having an advantage over the prior art. The advantage involves using a flotation plate under the scraper member of the soil leveling apparatus to compensate for varying types of soil, varying soil moisture and different levels of operator experience. Other advantages will be evident to those skilled in the art.

Although particular embodiments of the invention have been illustrated in the accompanying drawings and described in the foregoing detailed description, it will be understood that the invention is not limited only to the embodiments disclosed, but is intended to embrace any equivalents modividations, substitutions and/or rearrangements of elements falling within the scope of the invention as defined by the following claims.

I claim:

1. An apparatus for leveling soil, comprising:
a generally rectangular frame including a transverse elongate scraper member and at least one trailing transverse elongate ground engaging member each fixedly secured in mutually spaced apart relationship between a pair of longitudinal side members;
the scraper member including a leading lower edge, and each ground engaging member including a lower surface, with the leading edge of the scraper member and the lower surfaces of the ground engaging members being substantially coplanar;
a hitch means mounted on said frame which is adapted for releasable and generally rigid connection to a draft vehicle;
an elongate substantially horizontal plate mounted on and extending along a substantial portion of the length of said fixed scraper member for vertical movement on said scraper member; and
means for adjusting the vertical position of said horizontal plate, said adjusting means including means for permitting said horizontal plate to slide on said scraper member, whereby said apparatus is caused to float on the soil when said horizontal plate is lowered.

2. The soil leveling apparatus of claim 1 wherein: said adjusting means is constructed so that the lower limit of vertical movement of said plate is substantially coplanar with the lower portion of the said scraper and said ground engaging members.

3. The apparatus according to claim 1 further comprising a scarifying means for breaking up and loosening the soil.

4. The apparatus according to claim 1, wherein said hitch means further comprises a pair of laterally spaced apart vertical plates secured to said scraper member; and
a transverse plate means for connecting said vertical plates.

5. The apparatus of claim 4, wherein said transverse plate means further comprises an upper and lower portion, said upper portion comprising a transverse support means and said lower portion, including a pair of laterally spaced apart plates, each said plates having a rectangular hole defined therein.

6. The apparatus according to claim 1, wherein said plate has a curved rear edge.

7. An adjustable scraper apparatus for use on machines which are used for leveling soil and the like, comprising:
 an elongated scraper member which is adapted for mounting in an orientation which is substantially transverse to the intended direction of motion of the machine, said scraper member having an edge;
 an elongated substantially horizontal plate having a rounded rear edge mounted on and extending along a substantial portion of the length of said scraper member, said plate being vertically adjustably mounted on said scraper member;
 means for adjusting said plate relative to said scraper member edge, said adjusting means including means for sliding said plate vertically with respect to said scraper member; and
 means secured to said scraper member adapted for releasably and generally rigidly connecting the apparatus to a draft member vehicle, whereby said apparatus is caused to float on the soil.

8. The apparatus of claim 7 further including:
 a frame including one or more transverse elongated ground engaging members fixedly secured to one or more longitudinal members, the bottoms of said ground engaging members being substantially coplanar with the lower edge of said scraper member; and
 means to connect said frame to said scraper member in a trailing manner.

9. The apparatus of claim 7 further including:
 a scarifying means for breaking up and loosening the soil.

10. The apparatus according to claim 7 wherein:
 said plate is of a C shaped cross section, wherein one portion of said plates cross section is substantially flat;
 said plate having an adapter plate connecting said plate's edges;
 said adapter plate having a complementary mounting plate on said scraper member; and
 means for fastening said adapter plate to said complementary mounting plate.

11. The apparatus according to claim 10 including:
 means for moving said adapter plate on said complementary mounting plate to achieve vertical adjustment of said plate.

12. An apparatus for leveling soil, comprising:
 a generally rectangular frame including a transverse elongate scraper member and at least one trailing transverse elongate ground engaging member each fixedly secured in mutually spaced apart relationship between a pair of longitudinal side members;
 the scraper member including a leading lower edge, and each ground engaging member including a lower surface, with the leading edge of the scraper member and the lower surfaces of the ground engaging members being substantially coplanar;
 a hitch means mounted on said frame which is adapted for releasable and generally rigid connection to a draft vehicle;
 an elongate substantially horizontal plate mounted on and extending along a substantial portion of the length of said fixed scraper member; and
 means for removably mounting said horizontal plate on said scraper member in a position so that said horizontal plate is substantially coplanar with said lower surfaces of said ground engaging members, whereby said apparatus is caused to float on the soil.

13. The apparatus according to claim 12, wherein said plate has a curved rear edge.

* * * * *